United States Patent
Jauh et al.

(10) Patent No.: US 9,973,319 B2
(45) Date of Patent: May 15, 2018

(54) NETWORK ALLOCATION VECTOR IMPROVEMENT FOR WIRELESS NETWORKS

(71) Applicant: MEDIATEK INC., Hsinchu (TW)

(72) Inventors: Yuh-Ren Jauh, Taoyuan (TW); Chao-Chun Wang, Taipei (TW)

(73) Assignee: MEDIATEK INC., HsinChu (TW)

(*) Notice: Subject to any disclaimer, the term of this patent is extended or adjusted under 35 U.S.C. 154(b) by 171 days.

(21) Appl. No.: 14/946,975

(22) Filed: Nov. 20, 2015

(65) Prior Publication Data

US 2016/0149676 A1 May 26, 2016

Related U.S. Application Data

(60) Provisional application No. 62/082,676, filed on Nov. 21, 2014.

(51) Int. Cl.
| | |
|---|---|
| *H04L 5/00* | (2006.01) |
| *H04W 72/04* | (2009.01) |
| *H04W 52/24* | (2009.01) |
| *H04W 74/08* | (2009.01) |
| *H04W 84/12* | (2009.01) |

(52) U.S. Cl.
CPC .......... *H04L 5/006* (2013.01); *H04W 52/242* (2013.01); *H04W 72/04* (2013.01); *H04W 74/0816* (2013.01); *H04W 74/0808* (2013.01); *H04W 84/12* (2013.01)

(58) Field of Classification Search
CPC .... H04L 5/006; H04W 52/242; H04W 72/04; H04W 74/0808; H04W 74/0816
See application file for complete search history.

(56) References Cited

U.S. PATENT DOCUMENTS

| | | | |
|---|---|---|---|
| 8,811,203 B1* | 8/2014 | Liu | H04W 24/02 370/252 |
| 2012/0225687 A1* | 9/2012 | Norair | H04L 1/0061 455/522 |
| 2012/0327870 A1 | 12/2012 | Grandhi et al. | 370/329 |

(Continued)

FOREIGN PATENT DOCUMENTS

WO    WO2012177878 A1    12/2012

OTHER PUBLICATIONS

EPO, Search Report for the EP patent application 15195857.6 dated Apr. 21, 2016 (9 pages).

*Primary Examiner* — Khaled Kassim
*Assistant Examiner* — Saad A Waqas
(74) *Attorney, Agent, or Firm* — Imperium Patent Works; Zheng Jin

(57) ABSTRACT

A method of sub-channel independent network allocation vector (NAV) management by a wireless station (STA) in a wideband wireless communications system is proposed. In the wideband system having multiple sub-bands, each NAV for a corresponding sub-band is independently managed. The protection duration for each NAV is independent for each sub-band and the threshold or update rule for NAV modification is also independent for each sub-band. The threshold or update rule for NAV modification may also be different when the NAV is generated or propagated by an OBSS STA. Furthermore, early termination of NAV is allowed if the NAV is set by an OBSS STA only.

20 Claims, 5 Drawing Sheets

(56) References Cited

U.S. PATENT DOCUMENTS

| | | | |
|---|---|---|---|
| 2014/0086081 A1* | 3/2014 | Mack | H04L 5/006 370/252 |
| 2014/0098724 A1* | 4/2014 | Park | H04W 72/02 370/311 |
| 2014/0314056 A1* | 10/2014 | Park | H04B 7/2643 370/336 |
| 2014/0328268 A1 | 11/2014 | Zhu et al. | 370/329 |
| 2016/0128057 A1* | 5/2016 | Seok | H04L 5/0055 370/329 |
| 2016/0135142 A1* | 5/2016 | Lee | H04L 1/1671 370/329 |
| 2016/0242210 A1* | 8/2016 | Seok | H04W 74/0808 |

* cited by examiner

NETWORK ALLOCATION VECTOR IMPROVEMENT FOR WIRELESS NETWORKS

CROSS REFERENCE TO RELATED APPLICATIONS

This application claims priority under 35 U.S.C. § 119 from U.S. Provisional Application No. 62/082,676, entitled "NAV Improvements for OBSS," filed on Nov. 21, 2014, the subject matter of which is incorporated herein by reference.

TECHNICAL FIELD

The disclosed embodiments relate generally to wireless network communications, and, more particularly, to network allocation vector (NAV) improvement in wireless communications systems.

BACKGROUND

IEEE 802.11 is a set of media access control (MAC) and physical layer (PHY) specification for implementing wireless local area network (WLAN) communication, called Wi-Fi, in the unlicensed (2.4, 3.6, 5, and 60 GHz) frequency bands. The standards and amendments provide the basis for wireless network products using the Wi-Fi frequency bands. For example, IEEE 802.11ac is a wireless networking standard in the 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac.

In IEEE 802.11ac, a transmitter of a BSS (basis service set) of certain bandwidth is allowed to transmit radio signals onto the shared wireless medium depending on clear channel assessment (CCA) sensing and a deferral or backoff procedure for channel access contention. For a BSS of certain bandwidth, a valid transmission sub-channel shall have bandwidth, allowable in the IEEE 802.11ac, equal to or smaller than the full bandwidth of the BSS and contains the designated primary sub-channel of the BSS. Based on the CCA sensing in the valid transmission bandwidths, the transmitter is allowed to transmit in any of the valid transmission sub-channels as long as the CCA indicates the sub-channel is idle. This dynamic transmission bandwidth scheme allows system bandwidth resource to be efficiently utilized.

The network allocation vector (NAV) is a virtual carrier-sensing mechanism used with wireless network protocols such as IEEE 802.11. The virtual carrier sensing is a logical abstraction that limits the need for physical carrier sensing at the air interface in order to save power. The MAC layer frame headers contain a duration field that specifies the transmission time required for the frame, in which time the medium will be busy. The stations listening on the wireless medium read the Duration field and set their NAV, which is an indicator for a station on how long it must defer from accessing the medium. The NAV may be thought of as a counter, which counts down to zero at a uniform rate. When the counter is zero, the virtual CS indication is that the medium is idle; when nonzero, the indication is busy. The medium shall be determined to be busy when the STA is transmitting. In IEEE 802.11, the NAV represents the number of microseconds the sending STA intends to hold the medium busy (maximum of 32,767 microseconds).

The NAV behavior can be different when incoming packet is from intra BSS STA or inter BSS STA. NAV algorithm needs to consider this information. In IEEE 802.11, the NAV management is independent of the source BSS information. By considering the source BSS information, different NAV management algorithm can be applied when the NAV is generated or propagated by an OBSS STA. In IEEE 802.11 wider bandwidth case, NAV is detected by primary channel and set to the whole bandwidth. It is possible to have independent or mutual cooperated NAV management methods for different subband channels.

SUMMARY

A method of sub-channel independent network allocation vector (NAV) management by a wireless station (STA) in a wideband wireless communications system is proposed. In the wideband system having multiple sub-bands, each NAV for a corresponding sub-band is independently managed. The protection duration for each NAV is independent for each sub-band and the threshold or update rule for NAV modification is also independent for each sub-band. The threshold or update rule for NAV modification may also be different when the NAV is generated or propagated by an OBSS STA. Furthermore, early termination of NAV is allowed if the NAV is set by an OBSS STA only.

In one embodiment, a STA receives a first frame from a first STA on a first sub-band of a wideband communications system. The first frame carries information of a first protected duration, and a signal integrity of the first frame is recorded. The STA sets the first protection duration on the first sub-band if the signal integrity of the first frame exceeds a first predetermined threshold. The STA receives a second frame from a second STA on a second sub-band of the wideband communications system. The second frame carries information of a second protection duration, and a signal integrity of the second frame is recorded. The STA sets the second protection duration on the second sub-band if the signal integrity of the second frame exceeds a second predetermined threshold. The STA transmits a third frame on a third sub-band in accordance with a predetermined channel access rule. The third sub-band is not overlapping with the first sub-band and the second sub-band, and the third sub-band is a subset of the remaining narrow bands of the wideband communications system.

In another embodiment, a wireless station receives a frame in a wireless communications system. The frame carries information of a protection duration. A signal integrity of the frame is recorded. The wireless station sets a protection duration if the signal integrity of the frame exceeds a first predetermined threshold and if the protection duration is initiated by a BSS STA. On the other hand, the wireless station sets a protection duration if the signal integrity of the frame exceeds a second predetermined threshold and if the protection duration is initiated by an OBSS STA.

In a first example, the signal integrity of a frame is a received signal strength indicator (RSSI) associated with the frame. In a second example, the signal integrity of a frame is an estimated pathloss of the frame from a transmitting STA to the STA. In a third example, the signal integrity of the frame is a received signal strength indicator (RSSI)

associated with the frame subtracting an incoming transmit power of the frame. In a fourth example, the signal integrity of a frame is a received signal strength indicator (RSSI) associated with the frame subtracting an incoming transmit power of the frame and adding an outgoing transmit power of the STA.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
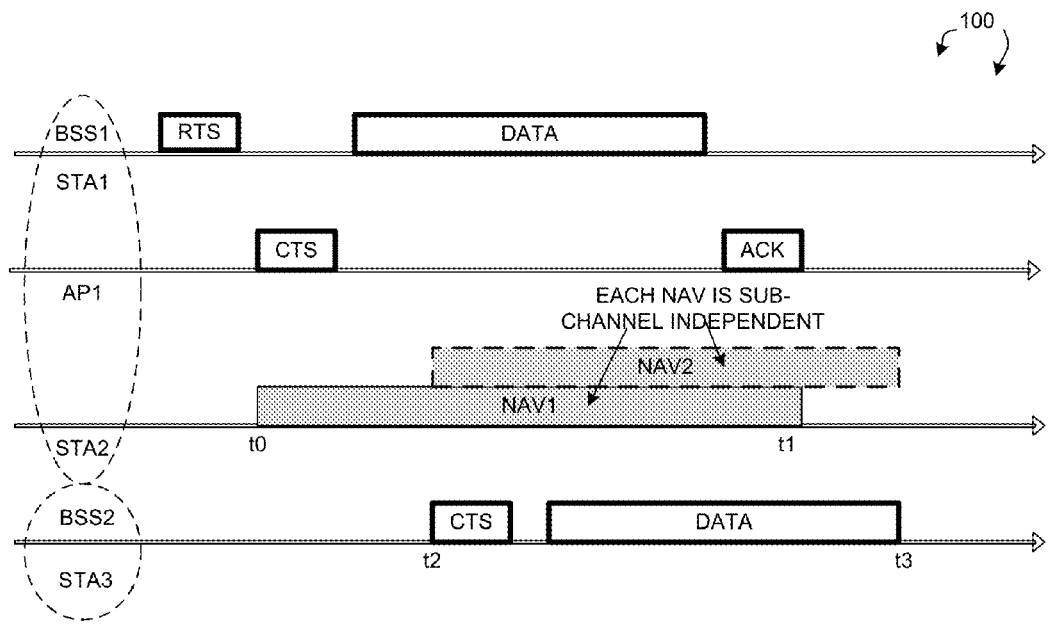
FIG. 1 illustrates a wideband wireless communications network with network allocation vector (NAV) improvements in accordance with one novel aspect.

FIG. 1 illustrates a wideband wireless communications network 100 with network allocation vector (NAV) improvements in accordance with one novel aspect. Wireless network 100 comprises a plurality of wireless stations STA1, STA2, STA3, and access point AP1. STA1 and STA2 belong to a first BSS1 having AP1 as an access point (AP), and STA3 belongs to a second BSS2. BSS1 and BSS2 are overlapping BSS (OBSS) with overlapping coverages. In the example of FIG. 1, STA1 and STA2 have gained the access to the wireless medium and have ongoing frame exchange between them. Meanwhile, spatial re-use STA3 initiates a spatial re-use frame exchange with other stations in BSS2 (e.g., another STA, STA4, not shown). Due to the ongoing frame exchange between STA1 and AP1, STA2 sets its NAV to non-zero from time t0 to t1. However, when spatial re-use STA3 establishes spatial re-use duration from t2 to t3, STA2 has to reset its NAV from t1 to t3. This results in an unfair advantage of spatial re-use STA3 over STA2 since it causes STA2 to be deferred further.

In IEEE 802.11 wireless networks, the NAV behavior can be different when incoming packet is from intra BSS STA or inter BSS STA. NAV algorithm needs to consider this information. In IEEE 802.11, the NAV management is independent of the source BSS information. By considering the source BSS information, different NAV management algorithm can be applied when the NAV is generated or propagated by an OBSS STA. In IEEE 802.11 wider bandwidth case, NAV is detected by primary channel and set to the whole bandwidth. It is possible to have independent or mutual cooperated NAV management methods for different subband channels.

In accordance with one novel aspect, STA2 applies improved NAV management algorithm considering sub-channel information as well as source BSS information. First, in wideband systems having multiple sub-bands, each NAV for a corresponding sub-band is independently managed. The protection duration for each NAV is independent for each sub-band and the threshold or update rule for NAV modification is also independent for each sub-band. Second, the threshold or update rule for NAV modification may also be different when the NAV is generated or propagated by an OBSS STA. Typically, the threshold for updating NAV may be higher if the NAV is initiated by an OBSS STA. Furthermore, early termination of NAV is allowed if the NAV is set by OBSS STA only.

In the example of FIG. 1, due to the ongoing frame exchange between STA1 and AP1 over sub-channel #1, STA2 sets a first NAV1 to non-zero from time t0 to t1 for sub-channel #1 if the signal strength of the received frame from STA1/AP1 is higher than a first threshold (NAV_BSS_thd). Later, when spatial re-use STA3 establishes spatial re-use duration from t2 to t3 over sub-channel #2, STA2 sets a second NAV2 to non-zero for sub-channel #2. If spatial re-use STA3 also uses sub-channel #1 for spatial re-use data transmission, then STA2 updates the first NAV1 for sub-channel #1 only if the signal strength of the received frame from STA3 is higher than a second threshold (NAV_OBSS_thd). Note that NAV_OBSS_thd is higher than NAV_BSS_thd.

Figure 2:
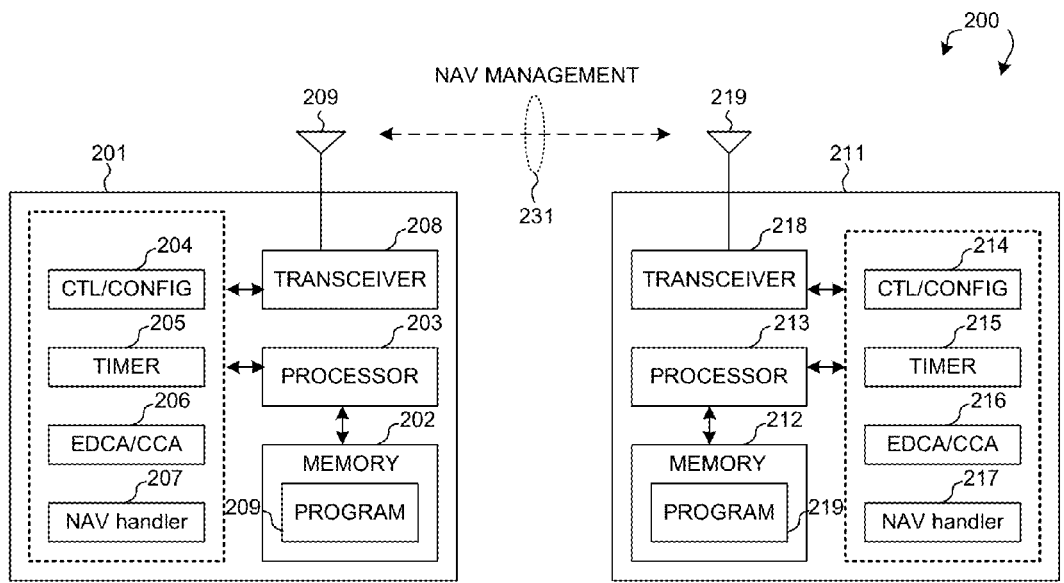
FIG. 2 is a simplified block diagram of a transmitting device and a receiving device for supporting certain features and embodiments in accordance with one novel aspect.

FIG. 2 is a simplified block diagram of an initiating device 201 and a responding device 211 in a wideband wireless communications network 200 in accordance with one novel aspect. Initiating device 201 comprises memory 202, a processor 203, a control and configuration module 204, a timer 205, an EDCA/CCA handler 206, a NAV handler 207, and a transceiver 208 coupled to antenna 209. Similarly, responding device 211 comprises memory 212, a processor 213, a control and configuration module 214, a timer 215, an enhanced distributed channel access protocol and clear channel assessment (EDCA/CCA) handler 216, a NAV handler 217, and a transceiver 218 coupled to antenna 219. In the transmitting direction, the transceiver converts received baseband signals from the processor to RF signals and sends out to the antenna. Similarly, in the receiving direction, the processor processes the received baseband signals from the transceiver and invoke different modules to be configured to perform various features supported by the wireless devices.

The different modules are functional circuits that can be configured and implemented in software, firmware, hardware, and any combination thereof. The functional circuits, when executed by processors 203 and 213 (via program instructions 209 and 219 contained in memory 202 and 212), interwork with each other to allow the wireless devices to perform NAV management algorithm. For example, the control and configuration module performs various control and configuration functionalities, the timer keeps tracks of various timing used during channel access and protection, the EDCA/CCA handler contends the wireless medium with other STAs through a random backoff EDCA procedure based on CCA rules, and the NAV handler determines sub-channel independent NAV values and applies NAV management algorithms for both BSS initiated and OBSS initiated NAV updates.

Figure 3:
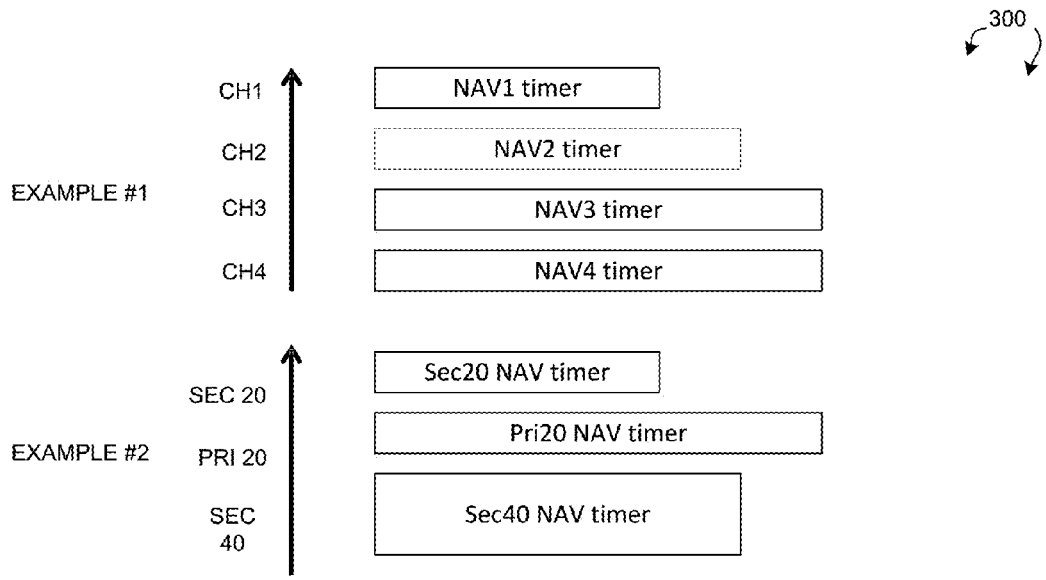
FIG. 3 illustrates examples of sub-channel independent NAV management in a wideband wireless communications network.

FIG. 3 illustrates examples of sub-channel independent NAV management in a wideband wireless communications network 300. In wireless communications network 300, the entire wideband is 80 MHz, which comprises a plurality of sub-bands, e.g., four 20 MHz sub-channels CH1, CH2, CH3, and CH4. In a first example #1, each 20 MHz sub-channel has its own independent NAV management, and maintains its own independent NAV timer. For example, CH1 has NAV1 timer, CH2 has NAV2 timer, CH3 has NAV3 timer, and CH4 has NAV4 timer. The NAV timer value, e.g., the protection duration for each sub-channel can be different. NAV1 timer value is shorter than NAV2 timer value, while NAV2 timer value is shorter than NAV3 and NAV4 timer value. In a second example #2, the 80 MHz wideband is divide into a primary 20 MHz sub-channel (Pri20), a secondary 20 MHz sub-channel (Sec20), and a secondary 40 MHz sub-channel (Sec40). Similar to example #1, each sub-channel has its own independent NAV management, and maintains its own independent NAV timer. For example, Sec20 has a Sec20NAV timer, Pri20 has a Pri20NAV timer, and Sec40 has a Sec40NAV timer. The NAV timer value, e.g., the protection duration for each sub-channel can be different. In addition, the threshold or update rule for each NAV can be different. For example, the Pri20 sub-channel can have a lower threshold than the Sec20 sub-channel.

Figure 4:
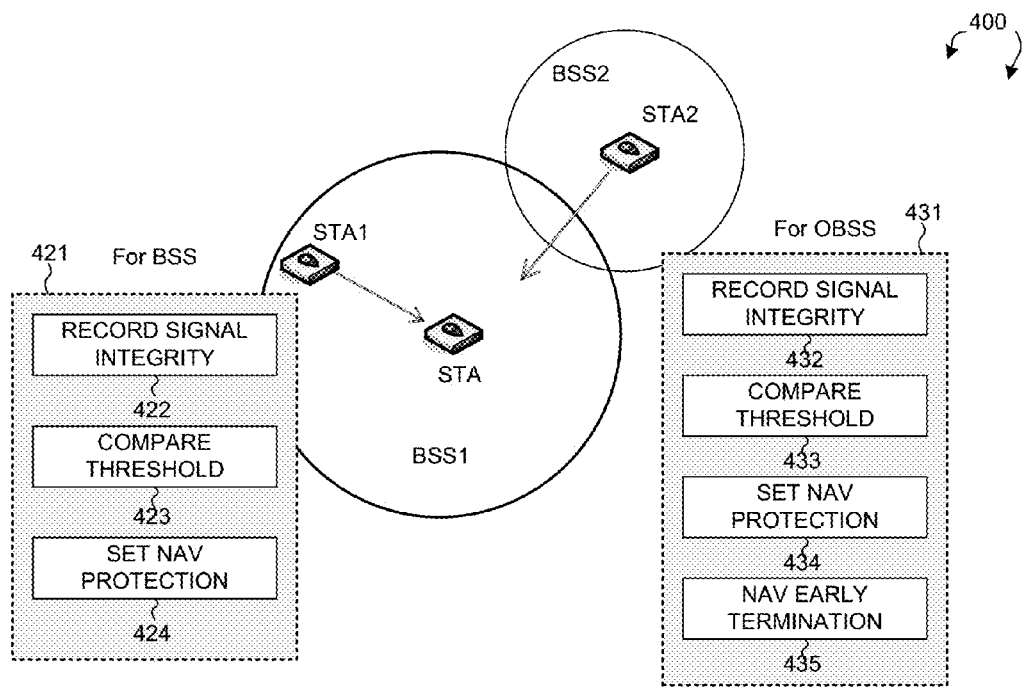
FIG. 4 illustrates a method flow of NAV management and modification for both BSS STAs and OBSS STAs in a wideband wireless communications network.

FIG. 4 illustrates a method flow of NAV management and modification improvements for both BSS STAs and OBSS STAs in a wireless communications network 400. Wideband wireless communications network 400 comprises a plurality of wireless stations STA, STA1 and STA2. STA and STA1 belong to a first BSS1, and STA2 belongs to a second BSS2. BSS1 and BSS2 are overlapping BSSs (OBSSs) with overlapping coverages. In the example of FIG. 4, STA is a receiving wireless station that detects received radio frames and updates its NAV settings accordingly. If STA receives radio frames from STA1, then the NAV is initiated by BSS STA. On the other hand, if STA receives radio frames from STA2, then the NAV is initiated by OBSS STA.

For BSS initiated NAV management, STA follows the steps as depicted by box 421. STA receives a radio frame from BSS STA1. Typically, the MAC layer frame header contains a duration field that specifies the transmission time required for the frame, in which time the medium will be busy. Upon receiving the radio frame from STA1, STA records the signal integrity of the radio frame (step 422). STA then compares the signal integrity with a predetermined threshold value, e.g., NAV_BSS_thd (step 423). If the signal integrity of the radio frame exceeds NAV_BSS_thd, then STA sets up a protection duration, e.g., sets the NAV counter corresponding to the protection duration as indicated by the radio frame (step 424). The NAV counter thus serves an indicator for STA on how long it must defer from accessing the medium. STA counts down the NAV counter to zero at a uniform rate. When the counter is zero, the virtual carrier sensing indication is that the medium is idle; when the counter is nonzero, the indication is that the medium is busy.

For OBSS initiated NAV management, STA follows the steps as depicted by box 431. STA receives a radio frame from OBSS STA2. Typically, the MAC layer frame header contains a duration field that specifies the transmission time required for the frame, in which time the medium will be busy. Upon receiving the radio frame from STA2, STA records the signal integrity of the radio frame (step 432). STA then compares the signal integrity with a predetermined threshold value, e.g., NAV_OBSS_thd (step 433). If the signal integrity of the radio frame exceeds NAV_OBSS_thd, then STA sets up a protection duration, e.g., sets the NAV counter corresponding to the protection duration as indicated by the radio frame (step 434). The NAV counter thus serves an indicator for STA on how long it must defer from accessing the medium. STA counts down the NAV counter to zero at a uniform rate. When the counter is zero, the virtual carrier sensing indication is that the medium is idle; when the counter nonzero, the indication is that the medium is busy.

There are different options when STA compares the signal integrity of a received radio frame with certain thresholds. First, there are different types of signal integrity to be applied. Second, there are different levels of thresholds to be applied. Each of the different types of signal integrity has its own threshold. Further, NAV initiated by BSS STA and NAV initiated by OBSS STA have different thresholds. The first option is to consider the received signal strength indicator (RSSI) of the radio frame. STA is allowed not to update the NAV if the received RSSI is smaller than NAV_BSS_thd. STA is allowed not to update the NAV if the received RSSI is smaller than NAV_OBSS_thd and if the NAV is initiated by OBSS STA. The second option is to consider estimated path loss of the radio frame. Pathloss is proportional to (incoming TX power/receiver RSSI) in linear scale, or (incoming TX power−receiver RSSI) in log scale. The incoming TX power can be provided by the TX STA in its PHY layer header. STA is allowed not to update the NAV if the estimated pathloss is higher than NAV_pathloss_thd1. STA is allowed not to update the NAV if the estimated pathloss is higher than NAV_pathloss_thd2 and if the NAV is initiated by OBSS STA. The third option is to consider the received RSSI minus the incoming TX power of the radio frame. STA is allowed not to update the NAV if (the received RSSI−incoming TX power) is smaller than NAV_combined_thd1. STA is allowed not to update the NAV if (the received RSSI−incoming TX power) is smaller than NAV_combined_thd2 and if the NAV is initiated by OBSS STA. The fourth option is to consider the received RSSI minus the incoming TX power of the radio frame plus the outgoing TX power. STA is allowed not to update the NAV if (the received RSSI−incoming TX power+outgoing TX power) is smaller than NAV_combined_thd3. STA is allowed not to update the NAV if (the received RSSI−incoming TX power+outgoing TX power) is smaller than NAV_combined_thd4 and if the NAV is initiated by OBSS STA. Furthermore, for OBSS STA initiated NAV, STA is allowed to terminate the NAV if the termination criteria is met by monitoring the CCA detection result (step 435).

Figure 5:
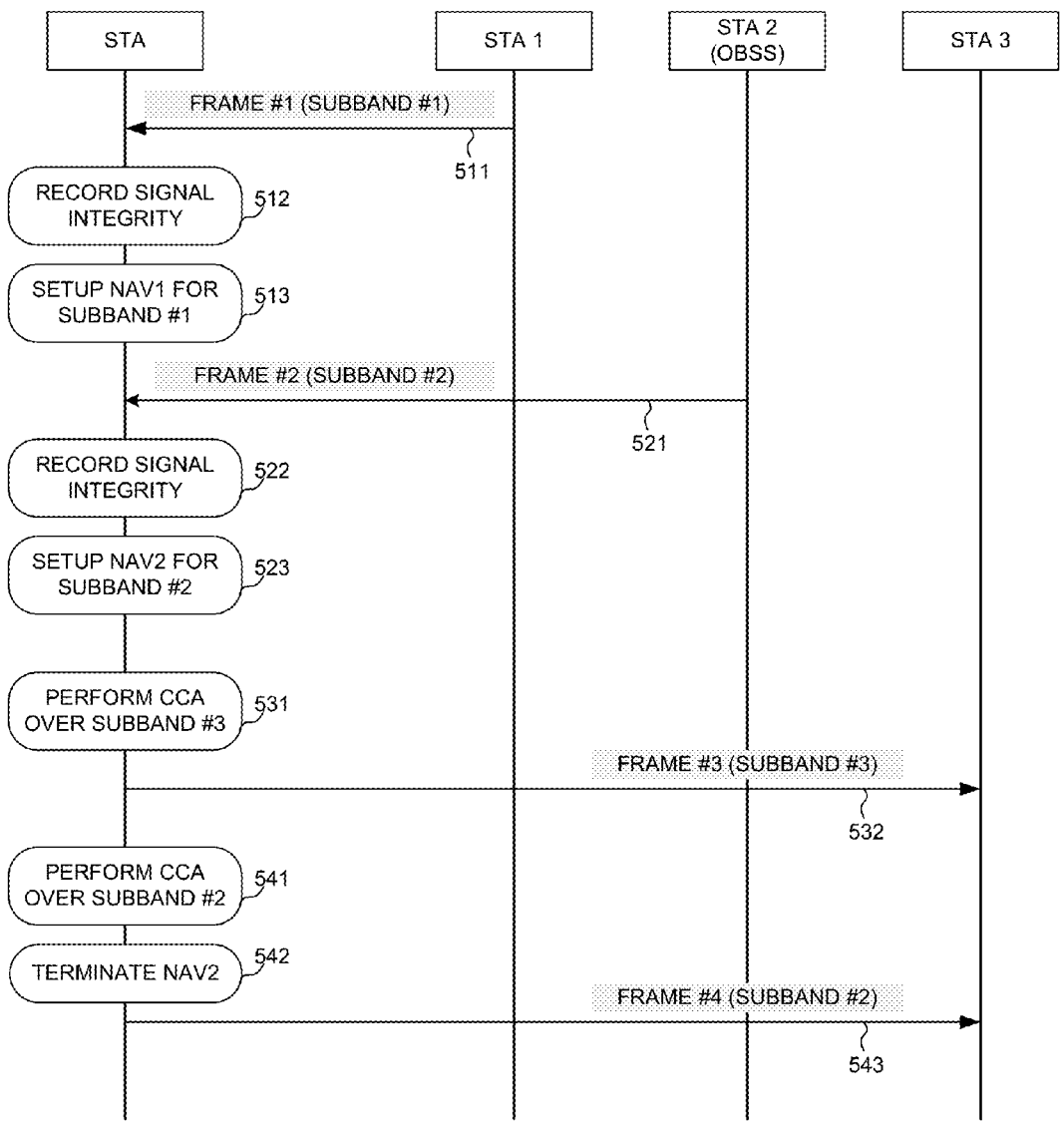
FIG. 5 illustrates a signal flow of a sub-channel independent NAV management procedure by a receiving STA for both BSS STAs and OBSS STAs in a wideband wireless communications network.

FIG. 5 illustrates a signal flow of a sub-channel independent NAV management procedure by a receiving STA for both BSS STAs and OBSS STAs in a wideband wireless communications network in accordance with one novel aspect. In step 511, a wireless station STA receives a first frame #1 over a first subband #1 from a first wireless station STA1. The MAC layer frame header contains a duration field that specifies the transmission time required for frame #1, in which time the medium will be busy over subband #1. In step 512, the STA records the signal integrity associated with frame #1. In step 513, the STA compares the signal integrity with a first predetermined threshold, and setup a first protection duration NAV1 for subband #1 if the signal integrity of frame #1 exceeds the first predetermined threshold. In step 521, the STA receives a second frame #2 over a second subband #2 from a second OBSS wireless station STA2. The MAC layer frame header contains a duration field that specifies the transmission time required for frame #2, in which time the medium will be busy over subband #2. In step 522, the STA records the signal integrity associated with frame #2. In step 523, the STA compares the signal integrity with a second predetermined threshold for OBSS initiated NAV, and setup a second protection duration NAV2 for subband #2 if the signal integrity of frame #2 exceeds the second predetermined threshold. Note that NAV1 and NAV2 are for two non-overlapping sub-channels and are independently maintained by the STA, and the predetermined thresholds for BSS initiated NAV and OBSS initiated NAV protection duration can be different.

In step 531, the STA performs EDCA/CCA procedure contending for channel access over subband #3. If the channel is idle, then in step 532, the STA transmit a third frame #3 to a third wireless station STA3 over subband #3. Note that subband #3 has non-overlapping with subband #1 and subband #2. The third subband #3 is a subset of the remaining narrow bands of the wideband communications system. Therefore, regardless of the NAV1 and NAV2 settings, the STA is able to transmit frame #3 over subband #3 as long as the contention for channel access over subband #3 is successful. Furthermore, the STA is allowed to terminate NAV2 since NAV2 is set by OBSS STA2 only. The termination criteria is required by monitoring the CCA detection result. In step 541, the STA performs EDCA/CCA procedure contending for channel access over subband #2. A counter from a set start value (RST NAV thd) is counted down when the channel is idle per CCA slot time will be used to clean NAV2 when the counter is countdown to zero (step 542). It is an option to reset counter to start value when the channel is busy. In step 543, the STA transmits a fourth frame #4 over subband #2 upon early termination of NAV2.

Figure 6:
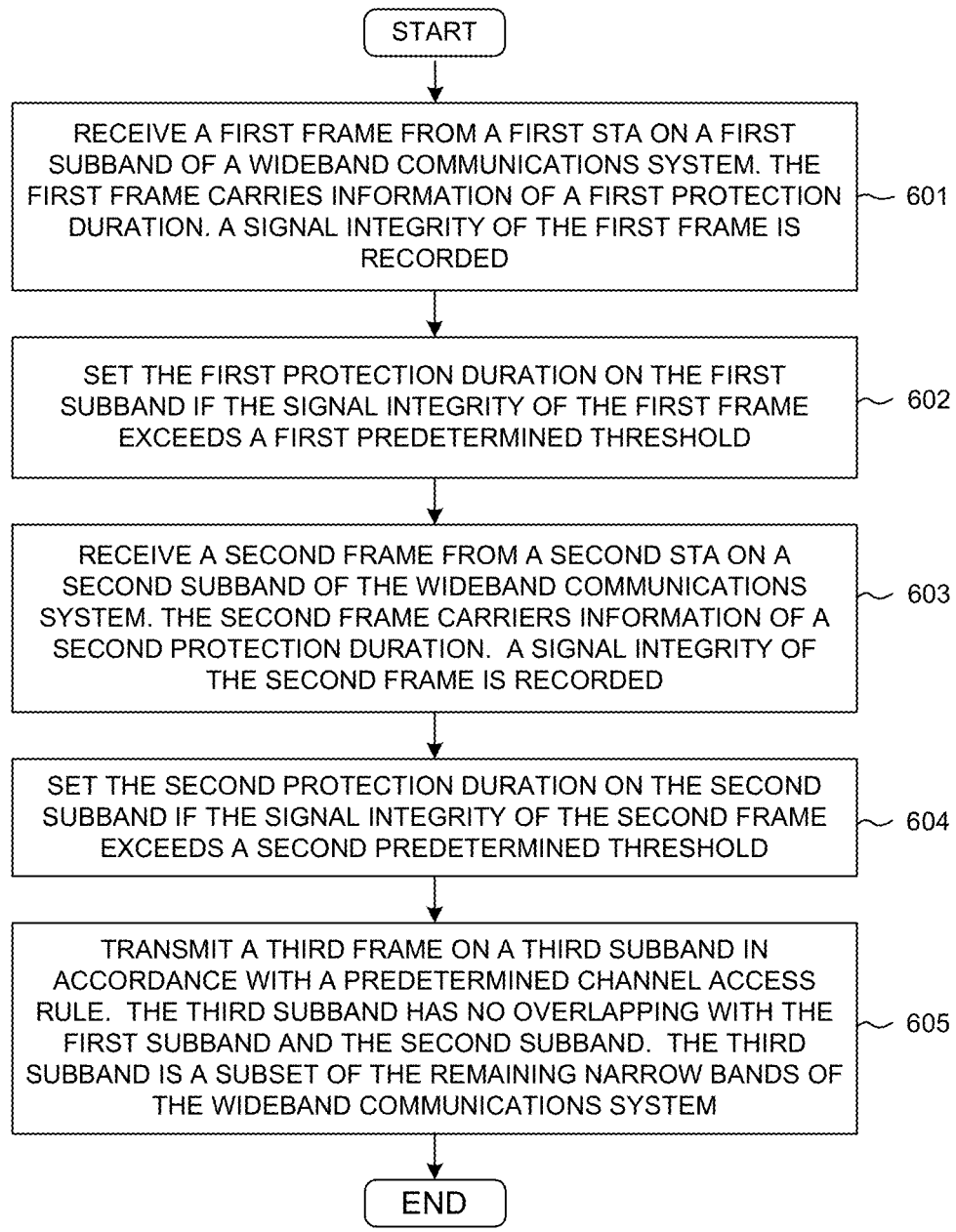
FIG. 6 is a flow chart of a method of sub-channel independent NAV management by a receiving STA in a wideband wireless communications network in accordance with one novel aspect.

FIG. 6 is a flow chart of a method of sub-channel independent NAV management by a receiving STA in a wideband wireless communications network in accordance with one novel aspect. In step 601, the STA receives a first frame from a first STA on a first sub-band of a wideband communications system. The first frame carries information of a first protected duration, and a signal integrity of the first frame is recorded. In step 602, the STA sets the first protection duration on the first sub-band if the signal integrity of the first frame exceeds a first predetermined threshold. In step 603, the STA receives a second frame from a second STA on a second sub-band of the wideband communications system. The second frame carries information of a second protection duration, and a signal integrity of the second frame is recorded. In step 604, the STA sets the second protection duration on the second sub-band if the signal integrity of the second frame exceeds a second predetermined threshold. In step 605, the STA transmits a third frame on a third sub-band in accordance with a predetermined channel access rule. The third sub-band is not overlapping with the first and the second sub-bands, and the third sub-band is a subset of the remaining narrow bands of the wideband communications system.

Figure 7:
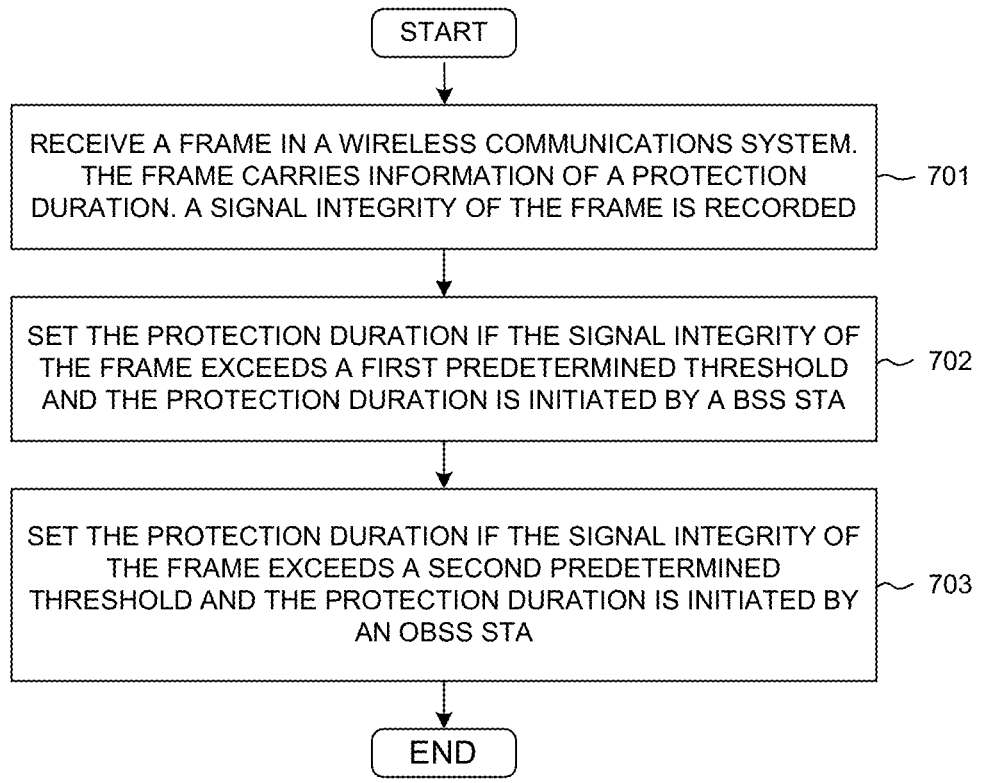
FIG. 7 is a flow chart of a method of NAV management and modification improvements for BSS and OBSS STAs in accordance with one novel aspect.

FIG. 7 is a flow chart of a method of NAV management and modification improvements for BSS and OBSS STAs in accordance with one novel aspect. In step 701, a wireless station receives a frame in a wireless communications system. The frame carries information of a protection duration. A signal integrity of the frame is recorded. In step 702, the wireless station sets a protection duration if the signal integrity of the frame exceeds a first predetermined threshold and if the protection duration is initiated by a BSS STA. In step 703, the wireless station sets a protection duration if the signal integrity and if the frame exceeds a second predetermined threshold of the protection duration is initiated by an OBSS STA.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method performed by a wireless station (STA), the method comprising:
   receiving a first frame from a first STA on a first sub-band of a wideband communications system, wherein the first frame carries information of a first protection duration, and wherein a signal integrity of the first frame is recorded;
   setting the first protection duration on the first sub-band if the signal integrity of the first frame exceeds a first predetermined threshold and the first protection duration is initiated by the first STA that is an unknown basic service set (BSS) STA;
   receiving a second frame from a second STA on a second sub-band of the wideband communications system, wherein the second frame carries information of a second protection duration, and wherein a signal integrity of the second frame is recorded;
   setting the second protection duration on the second sub-band if the signal integrity of the second frame exceeds a second predetermined threshold and the second protection duration is initiated by the second STA that is an overlapping basic service set (OBSS) STA, wherein the second predetermined threshold that is associated with the OBSS is higher than the first predetermined threshold that is associated with the unknown BSS; and
   transmitting a third frame on a third sub-band in accordance with a predetermined channel access rule, wherein the third sub-band has no overlapping with the first and the second sub-bands, and wherein the third sub-band is a subset of the remaining narrow bands of the wideband communications system.

2. The method of claim 1, wherein the first sub-band is a primary sub-channel and the second sub-band is a secondary sub-channel.

3. The method of claim 1, wherein the signal integrity of a frame is a received signal strength indicator (RSSI) associated with the frame.

4. The method of claim 1, wherein the signal integrity of a frame is an estimated pathloss of the frame from a transmitting STA to the STA.

5. The method of claim 1, wherein the signal integrity of the frame is a received signal strength indicator (RSSI) associated with the frame subtracting an incoming transmit power of the frame.

6. The method of claim 1, wherein the signal integrity of a frame is a received signal strength indicator (RSSI) associated with the frame subtracting an incoming transmit power of the frame and adding an outgoing transmit power of the STA.

7. The method of claim 1, wherein the predetermined channel access rule is in accordance with a clear channel assessment (CCA) sensing rule on the third sub-ban.

8. A wireless station (STA), comprising:
   a radio frequency (RF) receiver that receives a first frame from a first STA on a first sub-band of a wideband communications network, wherein the first frame carries information of a first protection duration, and wherein a signal integrity of the first frame is recorded;

a network allocation vector (NAV) handler circuit that sets the first protection duration on the first sub-band if the signal integrity of the first frame exceeds a first predetermined threshold and the first protection duration is initiated by the first STA that is an unknown basic service set (BSS) STA;

the RF receiver that receives a second frame from a second STA on a second sub-band of the wideband communications network, wherein the second frame carries information of a second protection duration, and wherein a signal integrity of the second frame is recorded;

the NAV handler circuit that sets the second protection duration on the second sub-band if the signal integrity of the second frame exceeds a second predetermined threshold and the second protection duration is initiated by the second STA that is an overlapping basic service set (OBSS) STA, wherein the second predetermined threshold that is associated with the OBSS is higher than the first predetermined threshold that is associated with the unknown BSS; and an RF transmitter that transmits a third frame on a third sub-band in accordance with a predetermined channel access rule, wherein the third sub-band has no overlapping with the first and the second sub-bands, and wherein the third sub-band is a subset of the remaining narrow bans of the wideband communications network.

9. The STA of claim 8, wherein the first sub-band is a primary sub-channel and the second sub-band is a secondary sub-channel.

10. The STA of claim 8, wherein the signal integrity of a frame is a received signal strength indicator (RSSI) associated with the frame.

11. The STA of claim 8, wherein the signal integrity of a frame is an estimated pathloss of the frame from a transmitting STA to the STA.

12. The STA of claim 8, wherein the signal integrity of the frame is a received signal strength indicator (RSSI) associated with the frame subtracting an incoming transmit power of the frame.

13. The STA of claim 8, wherein the signal integrity of a frame is a received signal strength indicator (RSSI) associated with the frame subtracting an incoming transmit power of the frame and adding an outgoing transmit power of the STA.

14. A method performed by a wireless station (STA), the method comprising:

receiving a frame in a wideband communications system, wherein the frame carries information of a protected duration, and wherein a signal integrity of the frame is recorded;

setting the protection duration on a first sub-band of the wideband communication system if the signal integrity of the frame exceeds a first predetermined threshold and the protection duration is initiated by an unknown basic service set (BSS) STA; and setting the protection duration on a second sub-band of the wideband communications system if the signal integrity of the frame exceeds a second predetermined threshold and the protection duration is initiated by an overlapping BSS (OBSS) STA, wherein the second predetermined threshold that is associated with the OBSS is higher than the first predetermined threshold that is associated with the unknown BSS;

transmitting a frame on a third sub-band in accordance with a predetermined channel access rule, wherein the third sub-band has no overlapping with the first and the second sub-bands, and wherein the third sub-band is a subset of the remaining narrow bands of the wideband communications system.

15. The method of claim 14, wherein the signal integrity of a frame is a received signal strength indicator (RSSI) associated with the frame.

16. The method of claim 14, wherein the signal integrity of a frame is an estimated pathloss of the frame from a transmitting STA to the STA.

17. The method of claim 14, wherein the signal integrity of the frame is a received signal strength indicator (RSSI) associated with the frame subtracting an incoming transmit power of the frame.

18. The method of claim 14, wherein the signal integrity of a frame is a received signal strength indicator (RSSI) associated with the frame subtracting an incoming transmit power of the frame and adding an outgoing transmit power of the STA.

19. The method of claim 14, wherein the STA terminates the protection duration if it is initiated by the OBSS STA only.

20. The method of claim 19, wherein the termination of the protection duration is in accordance with a clear channel assessment (CCA) sensing result.

* * * * *

UNITED STATES PATENT AND TRADEMARK OFFICE
CERTIFICATE OF CORRECTION

PATENT NO. : 9,973,319 B2  
APPLICATION NO. : 14/946975  
DATED : May 15, 2018  
INVENTOR(S) : Yuh-Ren Jauh et al.

Page 1 of 1

It is certified that error appears in the above-identified patent and that said Letters Patent is hereby corrected as shown below:

In the Claims

Column 8, Line 64, the word "sub-ban" should be "sub-band"

Column 9, Line 30, the word "bans" should be "bands"

Signed and Sealed this
Seventeenth Day of July, 2018

Andrei Iancu
*Director of the United States Patent and Trademark Office*